(12) United States Patent  
Kim

(10) Patent No.: US 11,544,813 B2  
(45) Date of Patent: Jan. 3, 2023

(54) ARTIFICIAL NEURAL NETWORK MODEL AND ELECTRONIC DEVICE INCLUDING THE SAME

(71) Applicant: SAMSUNG ELECTRONICS CO., LTD., Suwon-si (KR)

(72) Inventor: Irina Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 358 days.

(21) Appl. No.: 16/822,188

(22) Filed: Mar. 18, 2020

(65) Prior Publication Data

US 2020/0410636 A1 Dec. 31, 2020

(30) Foreign Application Priority Data

Jun. 27, 2019 (KR) .................. 10-2019-0077255

(51) Int. Cl.
| | |
|---|---|
| *G06T 3/00* | (2006.01) |
| *G06T 7/90* | (2017.01) |
| *G06N 3/08* | (2006.01) |
| *G06N 3/04* | (2006.01) |
| *G06T 3/40* | (2006.01) |

(52) U.S. Cl.
CPC ............ *G06T 3/0031* (2013.01); *G06N 3/04* (2013.01); *G06N 3/08* (2013.01); *G06T 3/4015* (2013.01); *G06T 7/90* (2017.01); *G06T 2207/20084* (2013.01)

(58) Field of Classification Search
CPC ....... G06T 3/0031; G06T 3/4015; G06T 7/90; G06T 2207/20084; G06T 5/002; G06T 5/003; G06N 3/04; G06N 3/08; G06N 3/0454; G06N 3/0481; G06N 3/082  
See application file for complete search history.

(56) References Cited

U.S. PATENT DOCUMENTS

| | | | |
|---|---|---|---|
| 8,515,131 B2 | 8/2013 | Koch et al. | |
| 8,645,832 B2 | 2/2014 | Pea et al. | |
| 9,565,512 B2 | 2/2017 | Rhoads et al. | |
| 2006/0114526 A1* | 6/2006 | Hasegawa | G06T 3/4015 358/518 |
| 2009/0190855 A1* | 7/2009 | Kasahara | G06T 3/4015 382/275 |
| 2013/0038758 A1* | 2/2013 | Imade | G06T 3/4069 348/E5.031 |

(Continued)

*Primary Examiner* — Charles T Shedrick  
(74) *Attorney, Agent, or Firm* — F. Chau & Associates, LLC

(57) ABSTRACT

An electronic device is described, that includes a processing logic configured to receive input image data and generate output image data having a different format from the input image data using an artificial neural network model. The artificial neural network model includes a plurality of encoding layer units, including a plurality of layers located at a plurality of levels, respectively. The artificial neural network model also includes a plurality of decoding layer units including a plurality of layers and configured to form skip connections with the plurality of encoding layer units at the same levels. A first encoding layer unit of a first level receives a first input feature map and outputs a first output feature map. A first output feature map is based on the first input feature map, to a subsequent encoding layer unit and a decoding layer unit at the first level.

20 Claims, 14 Drawing Sheets

(56) References Cited

U.S. PATENT DOCUMENTS

| | | |
|---|---|---|
| 2013/0073738 A1 | 3/2013 | Reisman |
| 2016/0004931 A1 | 1/2016 | Andreopoulos et al. |
| 2016/0239706 A1 | 8/2016 | Dijkman et al. |
| 2016/0328646 A1 | 11/2016 | Lin et al. |
| 2018/0260793 A1* | 9/2018 | Li .................... G06N 3/084 |
| 2019/0030371 A1* | 1/2019 | Han .................. G06V 30/194 |
| 2019/0043178 A1 | 2/2019 | Chen et al. |
| 2019/0045168 A1* | 2/2019 | Chaudhuri ............ G06T 7/55 |
| 2019/0064378 A1 | 2/2019 | Liu |
| 2019/0073553 A1* | 3/2019 | Yao .................. G06K 9/6256 |
| 2019/0294661 A1* | 9/2019 | Sarkar ................ G06F 40/174 |
| 2020/0034948 A1* | 1/2020 | Park .................. G06N 3/0481 |
| 2020/0074271 A1* | 3/2020 | Liang .................... G06N 3/08 |
| 2020/0410636 A1* | 12/2020 | Kim .................... G06N 3/08 |
| 2021/0158096 A1* | 5/2021 | Sinha .................... G06N 3/08 |
| 2021/0217134 A1* | 7/2021 | Okamura ............ H04N 9/07 |
| 2021/0279509 A1* | 9/2021 | Meng .................. G06T 3/40 |
| 2022/0036523 A1* | 2/2022 | Moran ................ G06T 5/002 |

* cited by examiner

FIG. 10

| LV \ FD | 0 | 1 | 2 | 3 | 4 | 5 | 6 | 7 | 8 |
|---|---|---|---|---|---|---|---|---|---|
| FD1= a*LV+b | 64 | 96 | 128 | 160 | 192 | 224 | 256 | 288 | 320 |
| FD2= a*(LV^2)+b | 64 | 96 | 192 | 352 | 576 | 864 | 1216 | 1632 | 2112 |
| FD3= b*(2^LV) | 64 | 128 | 256 | 512 | 1024 | 2048 | 4096 | 8192 | 16384 |

ARTIFICIAL NEURAL NETWORK MODEL AND ELECTRONIC DEVICE INCLUDING THE SAME

CROSS-REFERENCE TO RELATED APPLICATION

This application claims the benefit of Korean Patent Application No. 10-2019-0077255, filed on Jun. 27, 2019, in the Korean Intellectual Property Office, the disclosure of which is incorporated by reference herein in its entirety.

BACKGROUND

The inventive concept relates to an artificial neural network (ANN) model, and more particularly, to an ANN model configured to perform an image processing operation and an electronic device including the ANN model.

Image sensors may contain a color filter array (CFA) to separate color information from detected light. Imaging devices may rebuild an image file using unfinished output color samples from the image sensor in a process known as demosaicing. A Bayer pattern mosaic is an example of a CFA that organizes colors using a square grid of sensors. A Red green Blue (RGB) image is a final output image of an image sensor, after filtering has occurred. Thus, an RGB image can be the product of a Bayer pattern mosaic after image processing.

An image sensor containing a CFA may produce very large image files. Therefore, the process of demosaicing an image from an image sensor with a CFA (e.g., a Bayer pattern) to an output format (e.g., an RGB image) may be costly in both time and processing power. Therefore, there is a need in the art for systems and methods to efficiently convert a high resolution image in a CFA format to a usable output image.

SUMMARY

The inventive concept provides an artificial neural network (ANN) model having a new structure for changing a format of an image and an electronic device including the ANN model.

According to an aspect of the inventive concept, there is provided an electronic device including a processing logic configured to receive input image data and generate output image data having a different format from the input image data using an artificial neural network model. The artificial neural network model includes a plurality of encoding layer units including a plurality of layers located at a plurality of levels, respectively, and a plurality of decoding layer units including a plurality of layers and configured to form skip connections with the plurality of encoding layer units at the same levels. A first encoding layer unit of a first level receives a first input feature map and outputs a first output feature map, which is based on the first input feature map, to a subsequent encoding layer unit and a decoding layer unit at the first level. The encoding layer unit may be at the next level after the first level and the decoding layer unit connected by the skip connection.

According to another aspect of the inventive concept, there is provided an electronic device including a processing logic configured to perform an operation using an artificial neural network model. The artificial neural network model includes a plurality of encoding layer units including a plurality of layers located at a plurality of levels, respectively, and a plurality of decoding layer units including a plurality of layers and located at the plurality of levels, respectively. A first encoding layer unit located at a first level of the plurality of levels receives a first input feature map, outputs a first output feature map to an encoding layer unit located at the next level of the first level and a decoding layer unit located at the first level, and adjusts a depth of the first output feature map based on the first level.

According to another aspect of the inventive concept, there is provided an electronic device configured to perform an image processing operation. The electronic device includes a processing logic configured to receive tetra image data from a color filter array in which four identical color filters are arranged in two rows and two columns and form one pixel unit. The processing logic generates output image data having a different format from the tetra image data using an artificial neural network model. The artificial neural network model includes a plurality of encoding layer units including a plurality of layers located at a plurality of levels, respectively, and a plurality of decoding layer units including a plurality of layers and configured to form skip connections with the plurality of encoding layer units located at the same levels as the plurality of decoding layer units. A first encoding layer unit receives a first input feature map and outputs a first output feature map, which is based on the first input feature map, to a subsequent encoding layer unit and a decoding layer unit at the first level, which are at the next level and connected by the skip connection.

BRIEF DESCRIPTION OF THE DRAWINGS

Embodiments of the inventive concept will be more clearly understood from the following detailed description taken in conjunction with the accompanying drawings in which:

FIG. 10 shows a table of depth values of a feature map according to an example embodiment;

DETAILED DESCRIPTION

The present disclosure provides an artificial neural network (ANN) model for changing a format of an image, and an electronic device including the ANN model. An ANN refers to a computational architecture that is modeled on a biological brain. That is, an ANN may be a hardware or a software component that includes a number of connected nodes (a.k.a., artificial neurons), which may loosely correspond to the neurons in a human brain. Each connection, or edge, may transmit a signal from one node to another (like the physical synapses in a brain). When a node receives a signal, it can process the signal and then transmit the processed signal to other connected nodes. In some cases, the signals between nodes comprise real numbers, and the output of each node may be computed by a function of the sum of its inputs. Each node and edge may be associated with one or more node weights that determine how the signal is processed and transmitted.

During the training process, these weights may be adjusted to improve the accuracy of the result (i.e., by minimizing a loss function which corresponds in some way to the difference between the current result and the target result). The weight of an edge may increase or decrease the strength of the signal transmitted between nodes. In some cases, nodes may have a threshold below which a signal is not transmitted at all. The nodes may also be aggregated into layers. Different layers may perform different transformations on their inputs. The initial layer may be known as the input layer and the last layer may be known as the output layer. In some cases, signals may traverse certain layers multiple times.

Deep learning or machine learning models may be implemented based on an ANN. As the number of operations to be processed using the ANN have increased, it becomes more efficient to perform operations using an ANN compared to conventional alternatives.

According to embodiments of the present disclosure, an ANN model may be configured to convert a high resolution image file to another file format, such as an RGB image. The input image of the ANN model may be a high resolution file from an image sensors with a color filter array (CFA). The output of the ANN model may be a usable RGB image. Embodiments of the present disclosure use one or more convolution layers to output a feature map at various layers, or steps, in image encoding and decoding. Feature maps at the same level may be transmitted from the encoder to the decoder via a skip connection.

Hereinafter, embodiments of the inventive concept will be described in detail with reference to the attached drawings.

Figure 1:
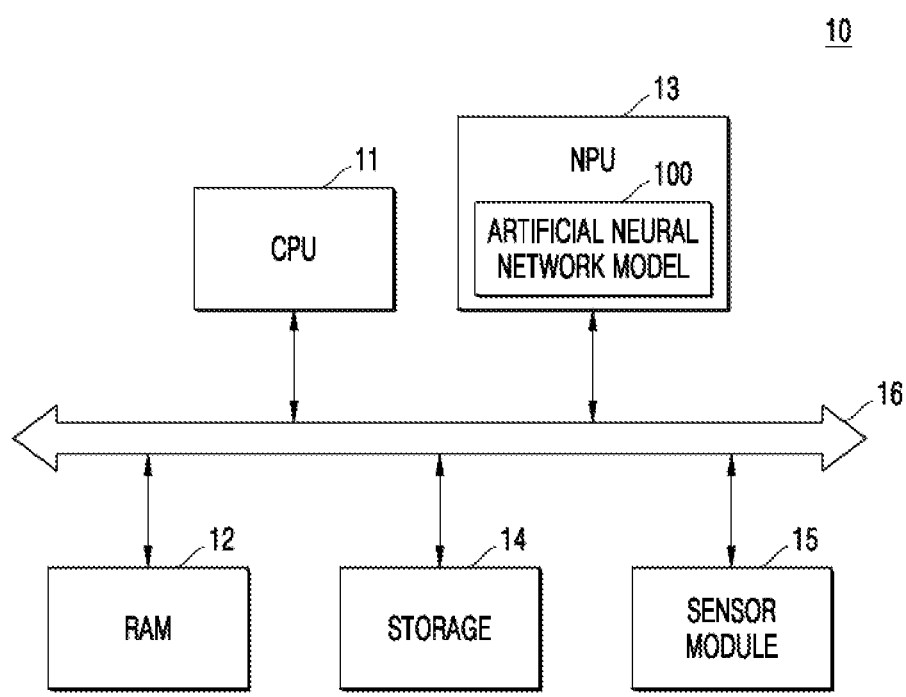
FIG. 1 is a block diagram of an electronic device according to an example embodiment.

FIG. 1 is a block diagram of an electronic device 10 according to an example embodiment.

The electronic device 10 according to the present embodiment may analyze input data in real-time based on an artificial neural network (ANN) model 100, extract valid information, and generate output data based on the extracted information. For example, the electronic device 10 may be applied to a smartphone, a mobile device, an image display device, an image capturing device, an image processing device, a measuring device, a smart TV, a robot device (e.g., a drone and an advanced drivers assistance system (ADAS)), a medical device, and an Internet of Things (IoT) device. Additionally, the electronic device 10 may be mounted on one of various kinds of electronic devices. For example, the electronic device 10 may include an application processor (AP). The AP may perform various kinds of operations, and a neural processing unit (NPU) 13 included in the AP may share an operation to be performed by the ANN model 100.

Referring to FIG. 1, the electronic device 10 may include a central processing unit (CPU) 11, random access memory (RAM) 12, a neural processing unit (NPU) 13, a memory 14, and a sensor module 15. The electronic device 10 may further include an input/output (I/O) module, a security module, and a power control device and further include various kinds of operation devices. For example, some or all components (i.e., the CPU 11, the RAM 12, the NPU 13, the memory 14, and the sensor module 15) of the electronic device 10 may be mounted on one semiconductor chip. For example, the electronic device 10 may include a System-on-Chip (SoC). Components of the electronic device 10 may communicate with each other through a bus 16.

The CPU 11 may control the overall operation of the electronic device 10. The CPU 11 may include one processor core (or a single core) or a plurality of processor cores (or a multi-core). The CPU 11 may process or execute programs and/or data stored in the memory 14. For example, the CPU 11 may execute the programs stored in the memory 14 and control a function of the NPU 13.

The RAM 12 may temporarily store programs, data, or instructions. For example, the programs and/or data stored in the memory 14 may be temporarily stored in the RAM 12 according to a control code or boot code of the CPU 11. The RAM 12 may include a memory, such as dynamic RAM (DRAM) or static RAM (SRAM).

The NPU 13 may receive input data, perform an operation based on the ANN model 100 and provide output data based on the operation result. The NPU 13 may perform an operation based on various kinds of networks, such as convolution neural network (CNN), region with convolution neural network (R-CNN), region proposal network (RPN), recurrent neural network (RNN), stacking-based deep neural network (S-DNN), state-space dynamic neural network (S-SDNN), deconvolution network, deep belief network (DBN), restricted Boltzmann machine (RBM), fully convolutional network, long short-term memory (LSTM) network, and classification network. However, the inventive concept is not limited thereto, and the NPU 13 may perform various operations that simulate human neural networks.

Figure 2:
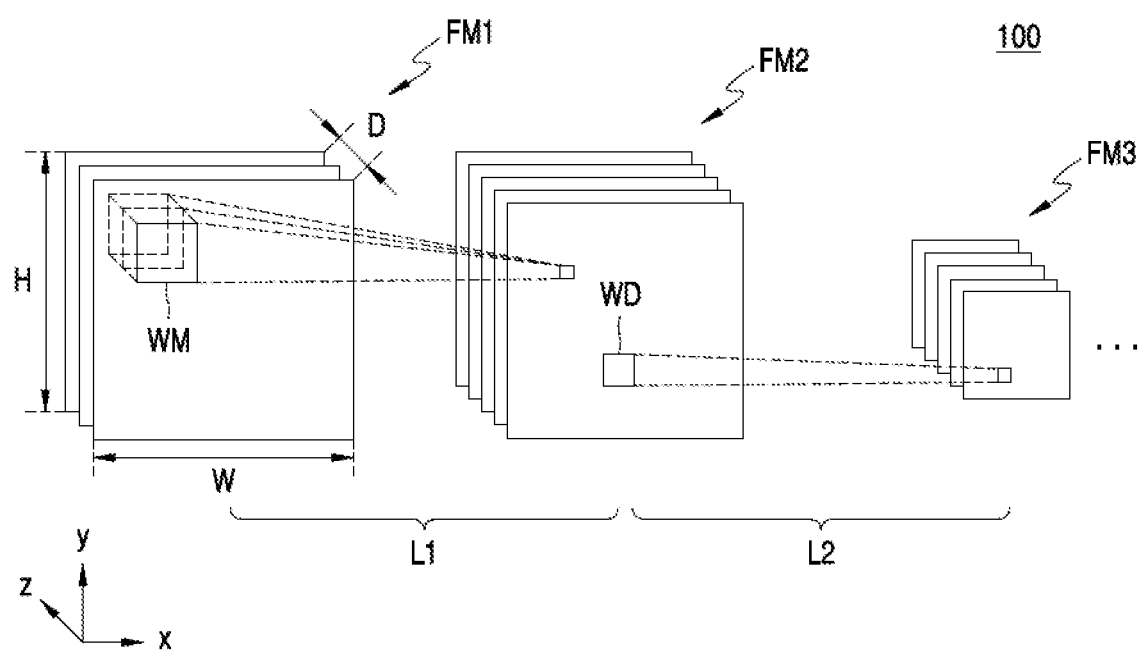
FIG. 2 is a diagram of an example of a neural network structure.

FIG. 2 is a diagram of an example of a neural network structure.

Referring to FIG. 2, an ANN model 100 may include a plurality of layers L1 to Ln. Each of the plurality of layers L1 to Ln may be a linear layer or a nonlinear layer. In some embodiments, a combination of at least one linear layer and at least one nonlinear layer may be referred to as one layer. For example, the linear layer may include a convolution layer and/or a fully connected layer, and the nonlinear layer may include a sampling layer, a pooling layer, and/or an activation layer.

As an example, a first layer L1 may include a convolution layer, and a second layer L2 may include a sampling layer. The ANN model 100 may include an activation layer and may further include a layer configured to perform a different kind of operation.

Each of the plurality of layers may receive input image data or a feature map generated in the previous layer as an input feature map, perform an operation on the input feature map, and generate an output feature map. In this case, the feature map may refer to data in which various features of input data are expressed. First to third feature maps FM1, FM2, and FM3 may have, for example, a two-dimensional (2D) matrix form or a three-dimensional (3D) matrix form. The first to third feature maps FM1, FM2, and FM3 may have a width W (or referred to as a column), a height H (or referred to as a row), and a depth D, which may respectively correspond to an x-axis, a y-axis, and a z-axis on coordinates. In this case, the depth D may be referred to as the number of channels.

The first layer L1 may convolute the first feature map FM1 with a weight map WM and generate the second feature map FM2. The weight map WM may filter the first feature map FM1 and may be referred to as a filter or a kernel. In some examples, a depth (i.e., the number of channels) of the weight map WM may be equal to a depth of the first feature map FM1. The channels of the weight map WM may be respectively convoluted with channels of the first feature map FM1 corresponding thereto. The weight map WM may be traversed and shifted using the first feature map FM1 as a sliding window. A shifted amount may be referred to as a "stride length" or a "stride." During each shift, each weight included in the weight map WM may be multiplied by, and added to, feature values in a region. The region may be where each of the weight values included in the weight map WM, overlaps with the first feature map FM1. By convoluting the first feature map FM1 with the weight map WM, one channel of the second feature map FM2 may be generated. Although one weight map WM is indicated in FIG. 2, a plurality of weight maps may be substantially convoluted with the first feature map FM1 to generate a plurality of channels of the second feature map FM2. In other words, the number of channels of the second feature map FM2 may correspond to the number of weight maps.

The second layer L2 may change a spatial size of the second feature map FM2 and generate the third feature map FM3. As an example, the second layer L2 may be a sampling layer. The second layer L2 may perform an up-sampling operation or a down-sampling operation. The second layer L2 may select a part of data included in the second feature map FM2. For example, a 2D window WD may be shifted on the second feature map FM2 in units of size (e.g., 4×4 matrix) of the window WD. A value of a specific position (e.g., a first row and a first column) in a region that overlaps with the window WD may be selected. The second layer L2 may output selected data as data of the third feature map FM3. In another example, the second layer L2 may be a pooling layer. In this case, the second layer L2 may select a maximum value (or an average value) of feature values in a region where the second feature map FM2 overlaps with the window WD. The second layer L2 may output selected data as data of the third feature map FM3.

Thus, the third feature map FM3 having a changed spatial size may be generated from the second feature map FM2. The number of channels of the third feature map FM3 may be equal to the number of the channels of the second feature map FM2. Meanwhile, according to an example embodiment, the sampling layer may have a higher operating speed than the pooling layer and increase the quality (e.g., peak signal to noise ratio (PSNR)) of an output image. For example, since an operation due to the pooling layer involves calculating the maximum value or the average value, the operation due to the pooling layer may take a longer operation time than an operation due to the sampling layer.

According to some embodiments, the second layer L2 is not limited to a sampling layer or a pooling layer. For example, the second layer L2 may be a convolution similar to the first layer L1. The second layer L2 may convolute the second feature map FM2 with a weight map and generate the third feature map FM3. In this case, the weight map on which the second layer L2 performs a convolution operation may be different compared to the weight map WM on which the first layer L1 performs a convolution operation.

An N-th layer may generate an N-th feature map through a plurality of layers including the first layer L1 and the second layer L2. The N-th feature map may be input to a reconstruction layer located at a back end of the ANN model 100, from which output data is output. The reconstruction layer may generate an output image based on the N-th feature map. Also, the reconstruction layer may receive the N-th feature map and a plurality of feature maps, such as the first feature map FM1 and the second feature map FM2, and generate an output image based on the plurality of feature maps.

For example, the reconstruction layer may be a convolution layer or a deconvolution layer. In some embodiments, the reconstruction layer may include a different kind of layer capable of reconstructing an image based on a feature map.

The memory 14, which is a storage site for storing data, may store, for example, an operating system (OS), various programs, and various pieces of data. The memory 14 may be DRAM but is not limited thereto. The memory 14 may include at least one of a volatile memory and a non-volatile memory. The non-volatile memory may include read-only memory (ROM), programmable ROM (PROM), electrically programmable ROM (EPROM), electrically erasable and programmable ROM (EEPROM), flash memory, phase-change random access memory (PRAM), magnetic RAM (MRAM), resistive RAM (RRAM), and/or ferroelectric RAM (FRAM). The volatile memory may include DRAM, SRAM, synchronous DRAM (SDRAM), PRAM, MRAM, RRAM, and/or FRAM. In an embodiment, the memory 14 may include at least one of a hard disk drive (HDD), a solid-state drive (SSD), a compact flash (CF) memory, a secure digital (SD) memory, a micro-SD memory, a mini-SD memory, an extreme digital (xD) memory, and a memory stick.

A sensor module 15 may collect information about a subject sensed by the electronic device 10. For example, the sensor module 15 may be an image sensor module. The sensor module 15 may sense or receive an image signal from the outside of the electronic device 10 and convert the image signal into image data (i.e., an image frame). As a result, the sensor module 15 may include at least one of various kinds of sensing devices, for example, an image capturing device, an image sensor, a light detection and ranging (LIDAR) sensor, an ultrasonic (UV) sensor, and an infrared (IR) sensor.

Figure 3:
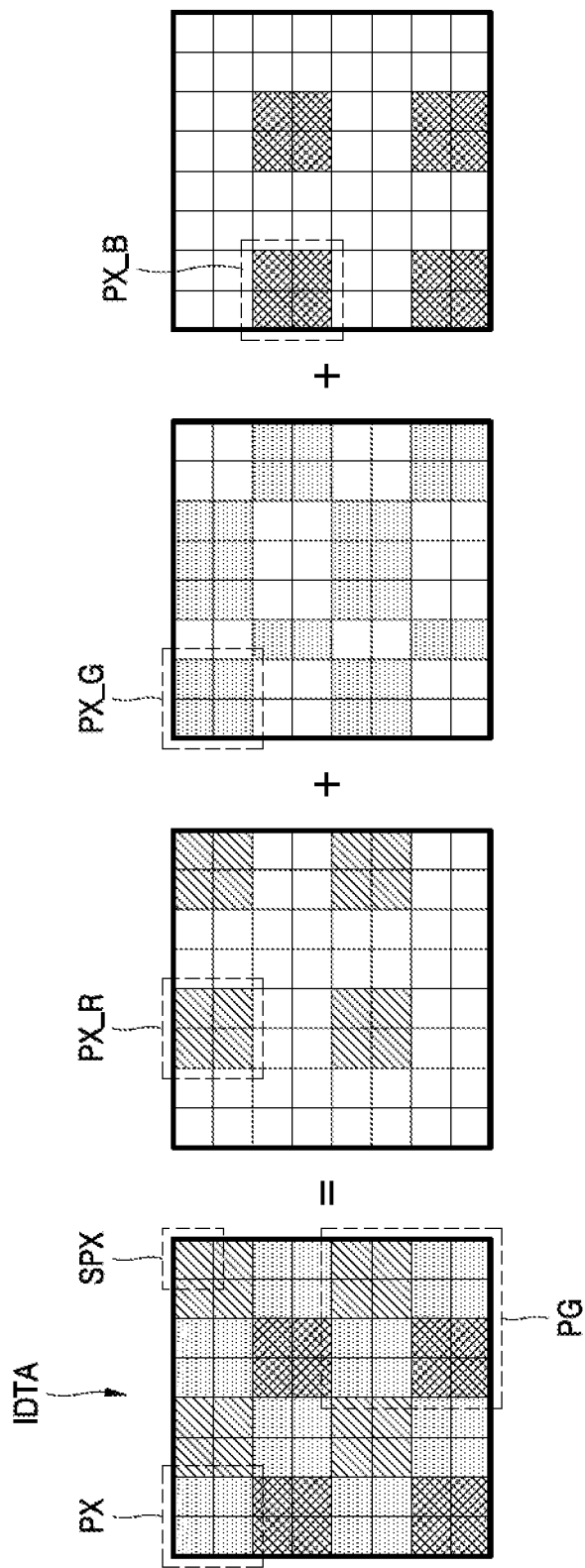
FIG. 3 is a diagram for explaining image data according to an example embodiment.

FIG. 3 is a diagram for explaining image data according to an example embodiment. Hereinafter, FIG. 3 will be described with reference to the reference numerals of FIGS. 1 and 2.

Referring to FIG. 3, input data IDTA may be image data received by an electronic device 10. For example, the input data IDTA may be input data IDTA received by an NPU 13 to generate an output image.

The input data IDTA may be a tetra cell image. The tetra cell image may be an image obtained by an image sensor with a color filter array similar to that of the input data IDTA shown in FIG. 3. For example, the color filter array may be a color filter array in which four identical color filters are arranged in two rows and two columns. The arrangement may form a pixel unit.

The input data IDTA may include a plurality of pixels PX. The pixel PX may be a unit of an image, which expresses one color, and include, for example, a red pixel PX_R, a green pixel PX_G, and a blue pixel PX_B. The pixel PX may include at least one sub-pixel SPX. The sub-pixel SPX may be a unit of data, which is obtained by the image sensor. For example, the sub-pixel SPX may be data obtained by one pixel circuit, which is included in the image sensor and includes one color filter. The sub-pixel SPX may express one color, for example, one of red, green, and blue.

The input data IDTA may include a plurality of pixel groups PG. The pixel group PX_G may include a plurality of pixels PX. For example, the pixel group PG may include multiple colors (e.g., red, green, and blue) that form the input data IDTA. For example, the pixel group PG may include a red pixel PX_R, a green pixel PX_G, and a blue pixel PX_B. Additionally, colors are not limited to red, green, and blue as described above, and may be implemented as various other colors, such as magenta, cyan, yellow, white, and the like.

The input data IDTA may be a piece of image data with various formats. For example, the input data IDTA may include a tetra image as described above. In another example, the input data IDTA may include an image of various formats, such as a Bayer pattern image, a red-green-blue-emerald (RGBE) pattern image, a cyan-yellow-yellow-magenta (CYYM) pattern image, a cyan-yellow-cyan-magenta (CYCM) pattern image, and a red-green-blue-white (RGBW) pattern image. For example, the inventive concept is not limited by formats of the input data IDTA.

Output data ODTA may be image data with a different format from the input data IDTA. For example, the output data ODTA may be a red-green-blue (RGB) image. The RGB image may be data indicating degrees to which red, green, and blue are expressed. The RGB image may be a color space based on red, green, and blue. For example, the RGB image may be an image of which a pattern is not distinguished unlike the input data IDTA. In other words, pieces of data, which indicate a red value, a green value, and a blue value, may be assigned to respective pixels included in the RGB image. The output data ODTA may have a different format from the input data IDTA. The output data ODTA is not limited thereto and may be, for example, YUV data. Here, Y may be a luma value, and U and V may be chroma values. The format of the output data ODTA is not limited to RGB data and YUV data and may be implemented as formats of various types. In the related art, when the output data ODTA has a different format from the input data IDTA, a large number of process operations may be used as described below.

Figure 4:
FIG. 4 is a block diagram of an image processing device according to a comparative example.

FIG. 4 is a block diagram of an image processing device according to a comparative example.

According to the comparative example, a plurality of processing and conversion operations may be used to receive input data IDTA and generate output data ODTA. Referring to FIG. 4, a pre-processor 21 may receive the input data IDTA and perform preprocessing operations, such as a crosstalk correction operation and a defect correction operation. The pre-processor 21 may perform a preprocessing operation based on the input data IDTA and output corrected input data IDTA_C. A Bayer converter 22 may receive the corrected input data IDTA_C and convert a pattern of an image into a Bayer pattern. For example, the Bayer converter 22 may perform a re-mosaic operation, a denoising operation, and a sharpening operation. The RGB converter 23 may receive a Bayer image IDTA_B, convert the Bayer image IDTA_b into an RGB image, and output the output data ODTA.

According to the comparative example, since a process of converting a format of the input data IDTA and generating the output data ODTA involves a large number of operations, time loss may occur. Furthermore, in some cases, embodiments of the comparative example may not substantially improve image quality.

Figure 5:
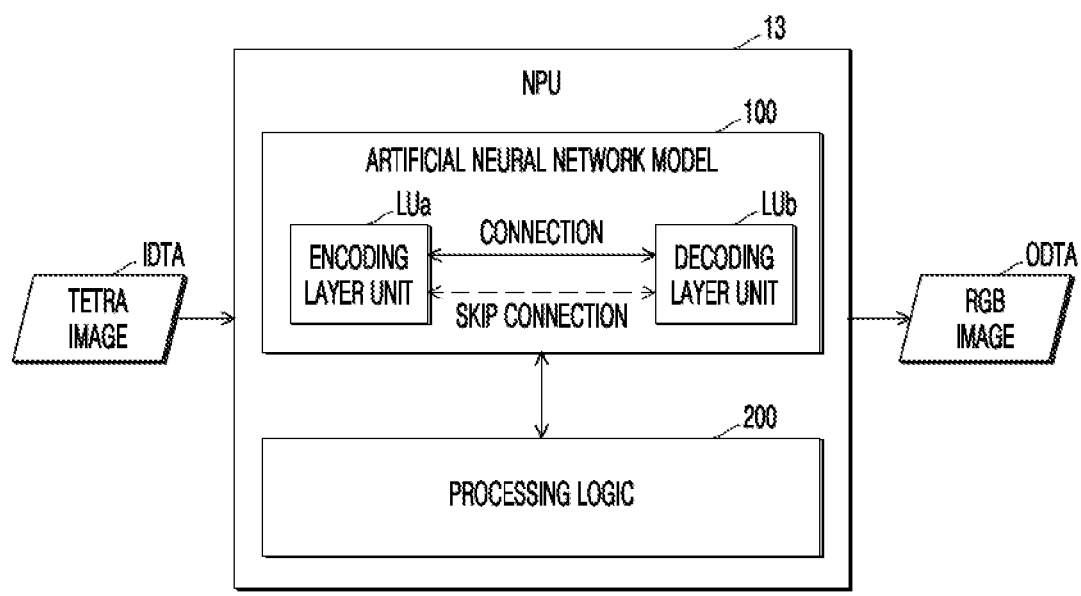
FIG. 5 is a block diagram for explaining a neural processing unit (NPU) according to an example embodiment.

FIG. 5 is a block diagram for explaining a neural processing unit (NPU) 13 according to an example embodiment.

Referring to FIG. 5, the NPU 13 may include a processing logic 200 configured to perform an operation based on an ANN model 100. The processing logic 200 may receive input data IDTA, perform an operation (e.g., an image processing operation) based on the input data IDTA, and output the output data ODTA. For example, the input data IDTA may be a tetra image, and the output data ODTA may be an RGB image. The inventive concept is not limited specific input data or output data. The processing logic 200 may generally control the ANN model 100. For example, the processing logic 200 may control various parameters, configurations, functions, operations, and connections, which are included in the ANN model 100. More specifically, the processing logic 200 may variously modify the ANN model 100 according to circumstances. For instance, the processing logic 200 may activate or deactivate a skip connection included in the ANN model 100.

According to an example embodiment, the processing logic 200 may perform an image processing operation based on the ANN model 100. The ANN model 100 may include a plurality of layer units. The layer units may include a plurality of layers, each of which may be provided to perform an operation (e.g., convolution operation). The operation is then assigned to the layer (e.g., convolution layer). Hereinafter, a plurality of layers included in an encoding layer unit LUa will be referred to as a plurality of encoding layers. A plurality of layers included in a decoding layer unit LUb will be referred to as a plurality of decoding layers.

According to an example embodiment, the layer units may include an encoding layer unit LUa and a decoding layer unit LUb. The encoding layer unit LUa and the decoding layer unit LUb may be implemented symmetrically to each other. For example, each of a plurality of encoding layer units LUa may have a level corresponding thereto. Additionally, each of a plurality of decoding layer units LUb may also have a level corresponding thereto. In other words, the plurality of encoding layer units LUa may have a plurality of levels and the plurality of decoding layer units LUb may also have a plurality of levels. For example, the number of levels of the plurality of encoding layer units LUa may be equal to the number of levels of the plurality of decoding layer units LUb. For example, the encoding layer unit LUa and the decoding layer unit LUb, which are at the same level, may include a layer of the same type. Also, the encoding layer unit LUa and the decoding layer unit LUb, which are at the same level, may establish a skip connection. The encoding layer unit LUa may sequentially encode image data. Additionally, the decoding layer unit LUb may sequentially decode data encoded by the encoding layer unit LUa and output the output data.

Referring to FIG. 5, the decoding layer unit LUb may receive data encoded by the encoding layer unit LUa. For example, the encoded data may be a feature map. The decoding layer unit LUb may receive the encoded data due to the skip connection established with the encoding layer unit LUa. For example, a skip connection refers to a process of directly propagating data from the encoding layer unit LUa to the decoding layer unit LUb while not propagating the data to a middle layer unit. The middle layer unit may be located between the encoding layer unit LUa and the decoding layer unit LUb. In other words, the encoding layer unit LUa may directly propagate data to the decoding layer unit LUb, which is at the same level as the encoding layer unit LUa. Alternatively, the encoding layer unit LUa and the decoding layer unit LUb may be selectively connected to each other due to a skip connection. In this case, the encoding layer unit LUa and the decoding layer unit LUb are at the same level. The skip connection may be activated or deactivated according to a skip level. For example, the skip connection may be a selective connection relationship based on the skip level.

The processing logic 200 may load the ANN model 100, perform an operation based on the input data IDTA, and output the output data DOTA based on an operation result. The processing logic 200 may control various parameters of the ANN model 100. For example, the processing logic 200 may control at least one of a width W, a height H, and a depth D of a feature map output by the encoding layer unit LUa or the decoding layer unit LUb.

Figure 6:
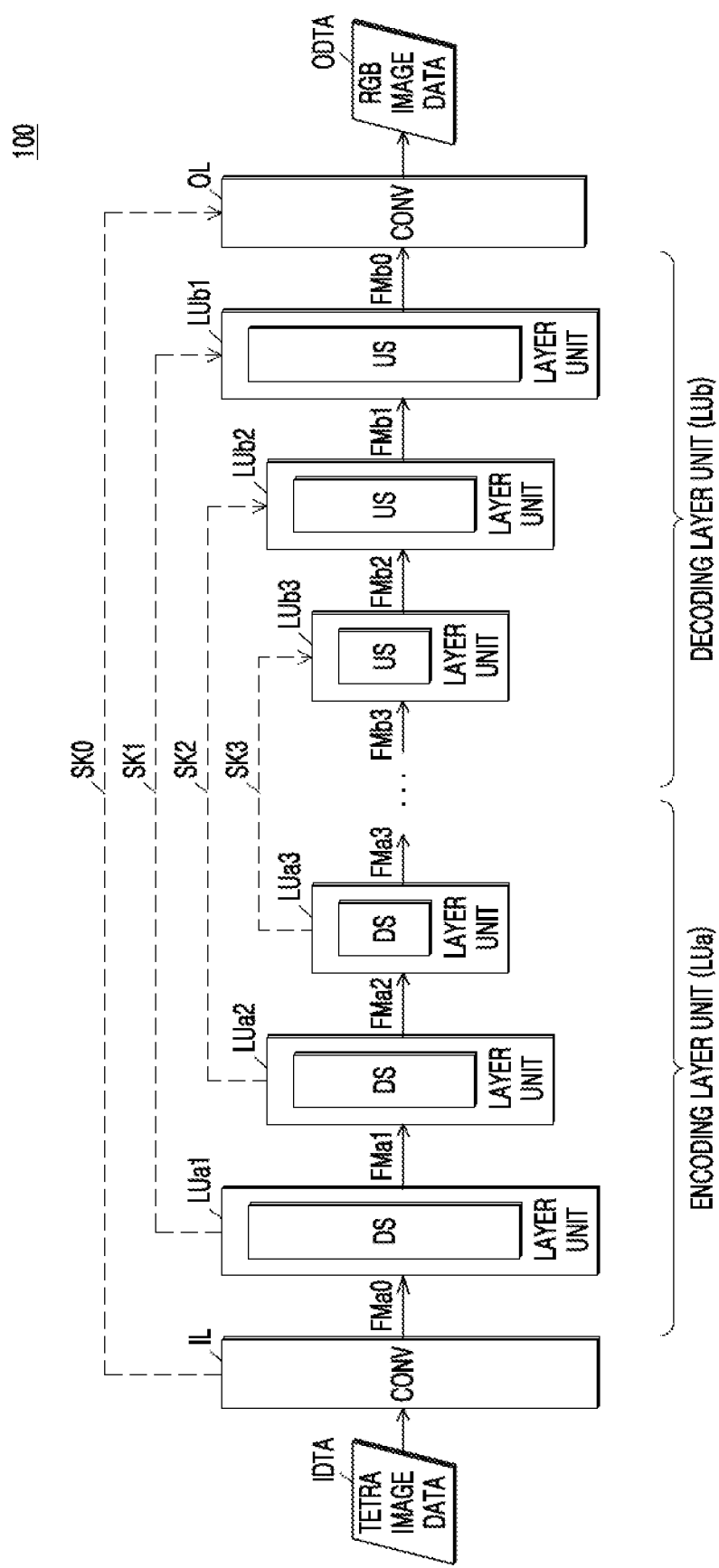
FIG. 6 is a diagram for explaining an artificial neural network (ANN) model according to an example embodiment.

FIG. 6 is a diagram for explaining an ANN model 100 according to an example embodiment.

Referring to FIG. 6, the ANN model 100 may include an input layer IL, an output layer OL, an encoding layer unit LUa, and a decoding layer unit LUb. The ANN model 100 may receive input data IDTA and calculate a feature value of the input data IDTA due to the input layer IL, the encoding layer unit LUa, the decoding layer unit LUb, and the output layer OL. For example, the ANN model 100 may receive a tetra image and perform an operation for converting the tetra image into an RGB image.

According to an example embodiment, the input layer IL may output a feature map FMa0 to a first encoding layer unit LUa1. For example, the input layer IL may include a convolution layer. In a similar manner to that described with reference to FIG. 2, the input layer IL may perform a convolution operation on the input data IDTA and a weight map. In this case, the weight map may perform a convolution operation with constant stride values while traversing the input data IDTA.

The encoding layer unit LUa may receive a feature map output by the previous encoding layer unit and perform an operation that may be assigned to each encoding layer unit (e.g., LUa1). For instance, the first encoding layer unit LUa1 may receive the feature map FMa0 and perform operations due to various layers included in the first encoding layer unit LUa1. For example, the encoding layer unit LUa may include a convolution layer, a sampling layer, and an activation layer. The convolution layer may perform a convolution operation. The sampling layer may perform a down-sampling operation, an up-sampling operation, an average pooling operation, or a maximum pooling operation. The activation layer may perform an operation due to a rectified linear unit (ReLU) function or a sigmoid function. The first encoding layer unit LUa1 may output a feature map FMa1 based on an operation result.

The feature map FMa1 output by the first encoding layer unit LUa1 may have a smaller width, a smaller height, and a greater depth than the input feature map FMa0. For example, the first encoding layer unit LUa1 may control the width, height, and depth of the feature map FMa1. For example, the first encoding layer unit LUa1 may control the depth of the feature map FMa1 not to be increased. The first encoding layer unit LUa1 may have a parameter for setting the depth of the feature map FMa1. Meanwhile, the first encoding layer unit LUa1 may include a down-sampling layer DS. The down-sampling layer DS may select predetermined feature values from among feature values included in the input feature map FMa0 and output the selected predetermined feature values as feature values of the feature map FMa1. In other words, the down-sampling layer DS may control the width and height of the feature map FMa1. A second encoding layer unit LUa2 and a third encoding layer unit LUa3 may also perform operations similar to the first encoding layer unit LUa1. For example, each of the second encoding layer unit LUa2 and the third encoding layer unit LUa3 may receive a feature map from the previous encoding layer unit, perform operations due to a plurality of layers included in the current layer unit, and output a feature map including an operation result to the next encoding layer unit.

The encoding layer unit LUa may output the feature map to the next encoding layer unit LUa or a decoding layer unit LUb located at the same level as the encoding layer unit LUa. Each encoding layer unit LUa may be fixedly connected to the next encoding layer unit LUa and connected to the decoding layer unit LUb at the same level by one or more skip connections (e.g., first to fourth skip connections SK0 to SK3). For example, the two layer units may be referred to as being at the same level when an ordinal number of one layer unit from the input layer IL is equal to an ordinal number of another layer unit from the output layer OL. The layer units at the same level may be, for example, the first encoding layer unit LUa1 and the first decoding layer unit LUb1.

The introduction of skip connections SK can improve the training of deep neural networks. Without skip connections, the introduction of additional layers can sometimes cause a degradation in the quality of the output (e.g., due to the vanishing learning gradient problem). Therefore, implementing one or more skip connections SK between the encoding layer units and the decoding layer units can improve the overall performance of the ANN by enabling more efficient training of deeper layers.

According to an example embodiment, at least some of a plurality of skip connections (e.g., the first to fourth skip connections SK0 to SK3) may be selected by a processing logic 200, an NPU 13, or an electronic device 10. For example, the processing logic 200 may receive information about a skip level. When a skip level of the ANN model 100 is set, some of the first to fourth skip connections SK0 to SK3, which correspond to a preset skip level, may be activated. For example, when the skip level of the ANN model 100 is equal to 2, the first skip connection SK0 and the second skip connection SK1 may be activated. Due to the activated skip connection, the encoding layer unit LUa may output a feature map to the decoding layer unit LUb. Inactivated skip connections (e.g., SK2 and SK3) may not propagate feature maps.

According to an example embodiment, layer units (e.g., LUa1 and LUb1) located at the same level may process feature maps with substantially the same size. For example, a size of the feature map FMa0 received by the first encoding layer unit LUa1 may be substantially equal to a size of a feature map FMb0 output by the first decoding layer unit LUb1. For example, a size of a feature map may include at least one of a width, a height, and a depth. Additionally, a size of the feature map FMa1 output by the first encoding layer unit LUa1 may be substantially equal to a size of a feature map FMb1 of the first decoding layer unit LUb1.

According to an example embodiment, the encoding layer unit LUa and the decoding layer unit LUb, which are at the same level, may have substantially the same sampling size. For example, a down-sampling size of the first encoding layer unit LUa1 may be equal to an up-sampling size of the first decoding layer unit LUb1.

The decoding layer unit LUb may receive a feature map from the previous decoding layer unit LUb or receive a feature map from the encoding layer unit LUa at the same level. The decoding layer unit LUb may process an operation using the received feature map. For example, the decoding layer unit LUb may include a convolution layer, a sampling layer, and an activation layer.

The feature map FMa1 output by the first encoding layer unit LUa1 may have a smaller width, a smaller height, and a greater depth than the input feature map FMa0. For example, the first encoding layer unit LUa1 may control the width, height, and depth of the feature map FMa1. For example, the first encoding layer unit LUa1 may control the depth of the feature map FMa1 not to be increased. The first encoding layer unit LUa1 may have a parameter for setting the depth of the feature map FMa1.

An up-sampling layer US may adjust a size of an input feature map. For example, the up-sampling layer US may adjust a width and height of the feature map. The up-sampling layer US may perform an up-sampling operation. The up-sampling operation may use respective feature values of the input feature map and feature values adjacent to the respective feature values. As an example, the up-sampling layer US may be a layer configured to write the same feature values to an output feature map using a nearest neighbor method. In another example, the up-sampling layer US may be a transpose convolution layer and up-sample an image using a predetermined weight map.

The output layer OL may reconstruct the feature map FMb0 output by the first decoding layer unit LUb1 into output data ODTA. The output layer OL may be a reconstruction layer configured to convert a feature map into image data. For example, the output layer OL may be one of a convolution layer, a deconvolution layer, and a transpose convolution layer. For example, the converted image data may be RGB data.

Figure 7A:
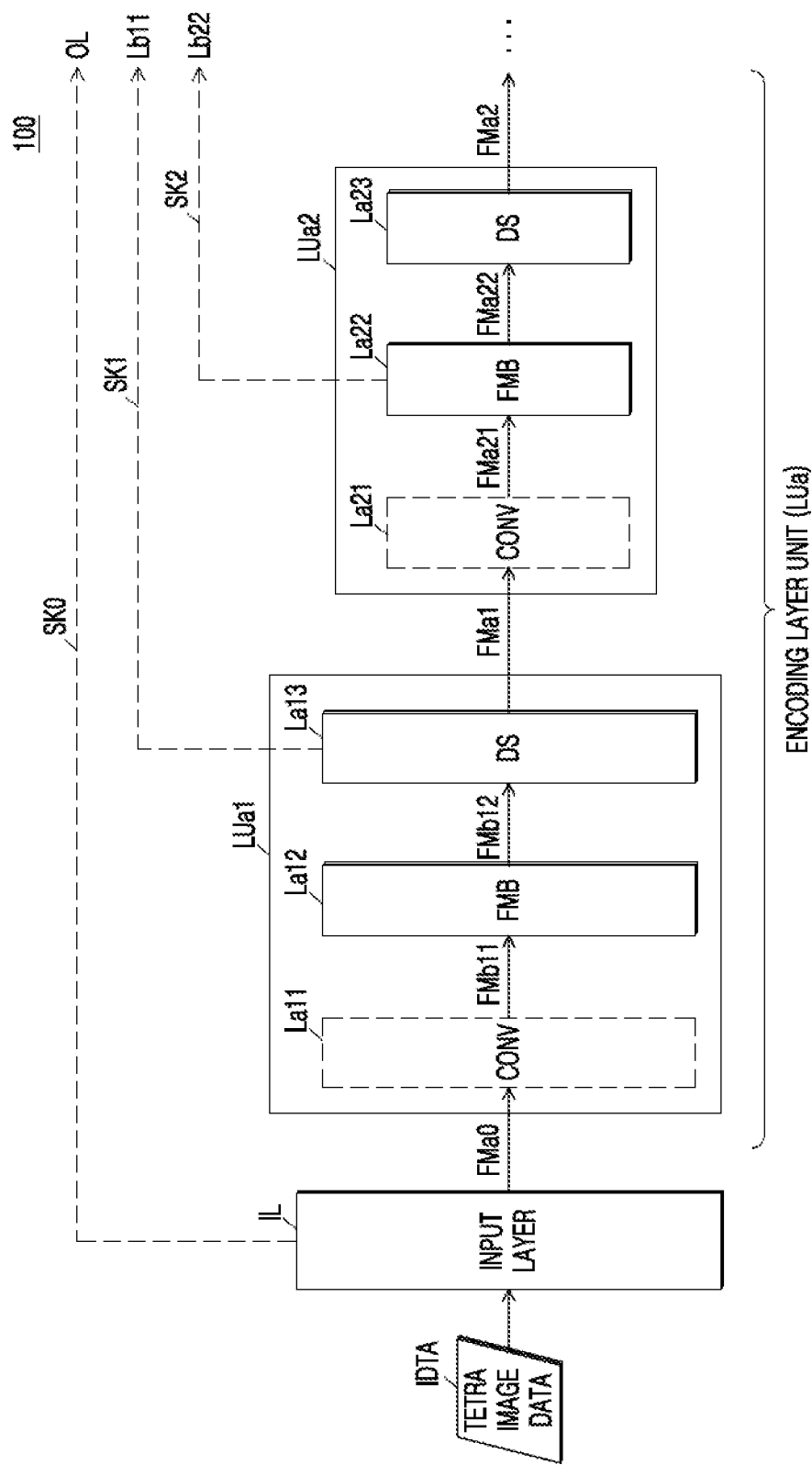
FIGS. 7A and 7B are block diagrams for explaining an encoding layer unit and a decoding layer unit according to an example embodiment.
Figure 7B:
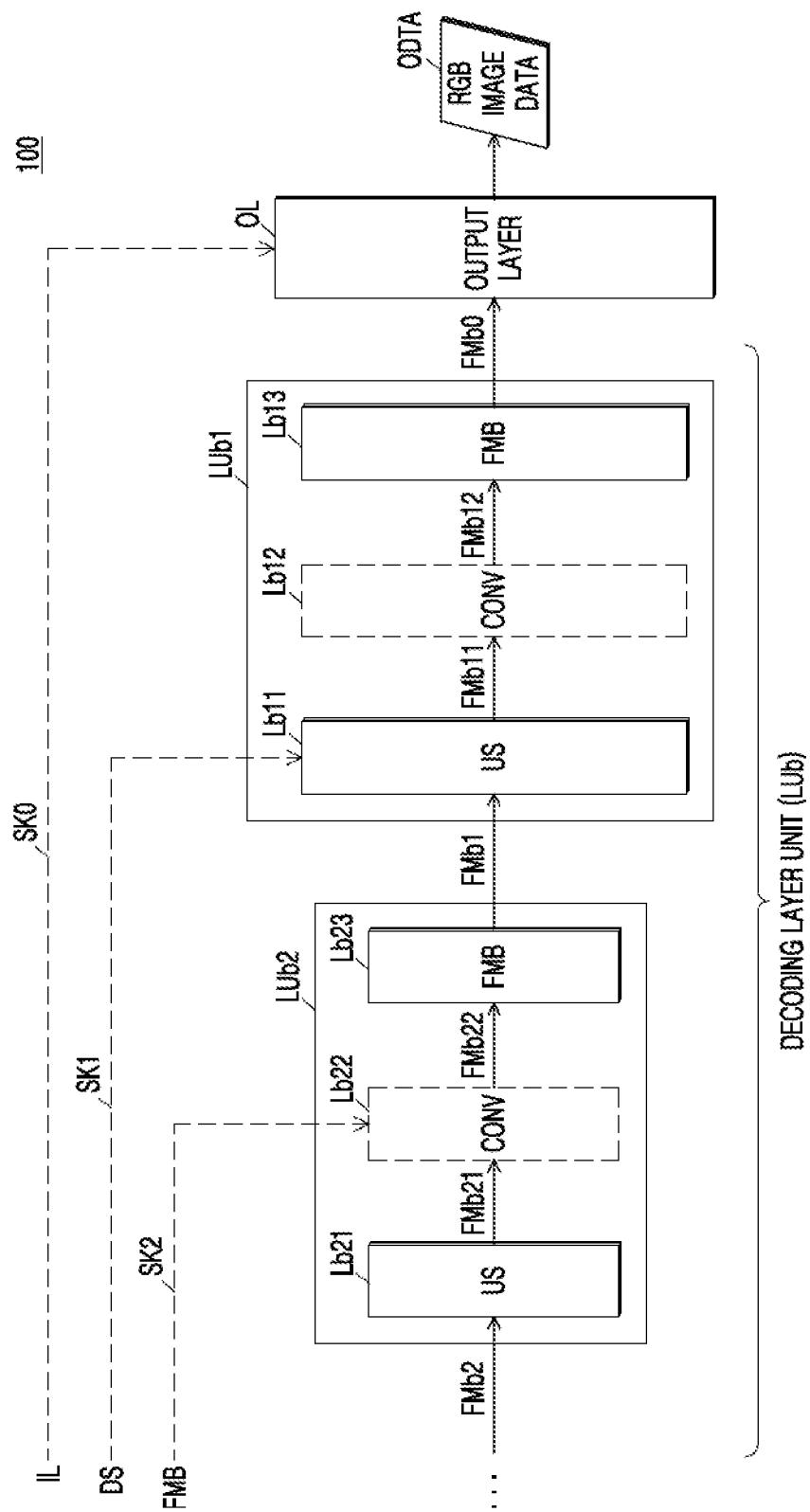

FIGS. 7A and 7B are block diagrams for explaining an encoding layer unit LUa and a decoding layer unit LUb according to an example embodiment.

Referring to FIG. 7A, the encoding layer unit LUa may include a feature map block FMB and a down-sampling layer DS and further include a convolution layer CONV. The feature map block FMB may include a plurality of convolution layers, a plurality of activation layers, and a summator, which will be described in detail below with reference to FIG. 8.

An input layer IL may form skip connection with an output layer OL. For example, a feature map FMa0 output by the input layer IL may be output to a first encoding layer unit LUa1 and an output layer OL. In another example, when a skip level is equal to 0, the input layer IL may not directly output a feature map to the output layer OL. In yet another example, when a skip level is equal to 1 or more, the input layer IL may directly output the feature map to the output layer OL.

A plurality of layers included in the encoding layer unit LUa may form skip connections with a plurality of layers of the decoding layer unit LUb corresponding respectively thereto. For example, at least some of the plurality of layers included in the encoding layer unit LUa may form skip connections with at least some of the plurality of layers included in the decoding layer unit LUb at the same level as the encoding layer unit LUa.

The plurality of layers included in the encoding layer unit LUa may form skip connections with a plurality of layers included in a decoding layer unit LUb configured to perform symmetrical operations thereto. For example, the convolution layers CONV and the feature map blocks FMB may form skip connections. The convolution layers CONV and the feature map blocks FMB are included in the encoding layer unit LUa and the decoding layer unit LUb and at the same levels. Also, the down-sampling layer DS and an up-sampling layer US, which are at the same level, may form a skip connection. Referring to FIGS. 7A and 7B, a down-sampling layer La13 and an up-sampling layer Lb11, which are at the same level, may form a skip connection. A feature map block La22 and a feature map block Lb22, which are at the same level, may form a skip connection. The above descriptions are provided for brevity. A feature map block La12 and feature map block Lb21, which are at the same level, may form a skip connection.

When a skip level is set, the ANN model 100 may activate some of a plurality of skip connections based on a preset skip level. For example, the ANN model 100 may directly propagate data to the decoding layer unit LUb from the encoding layer unit LUa with a level based on the preset skip level. In an example, when the skip level is equal to 0, skip connections may be inactivated. Whan skip connections are inactivated, feature maps may not be propagated from the encoding layer unit LUa via the skip connections. In another example, when the skip level is equal to 1, a first skip connection SK0 may be activated. When the first skip connection SK0 is activated, the input layer IL may propagate the feature map FMa0 to the output layer OL. In yet another example, when the skip level is equal to 2, at least some of the input layer IL and layers included in the first encoding layer unit LUa1 may propagate feature maps to at least some of the output layer OL and layers included in the first decoding layer unit LUb1.

Figure 8:
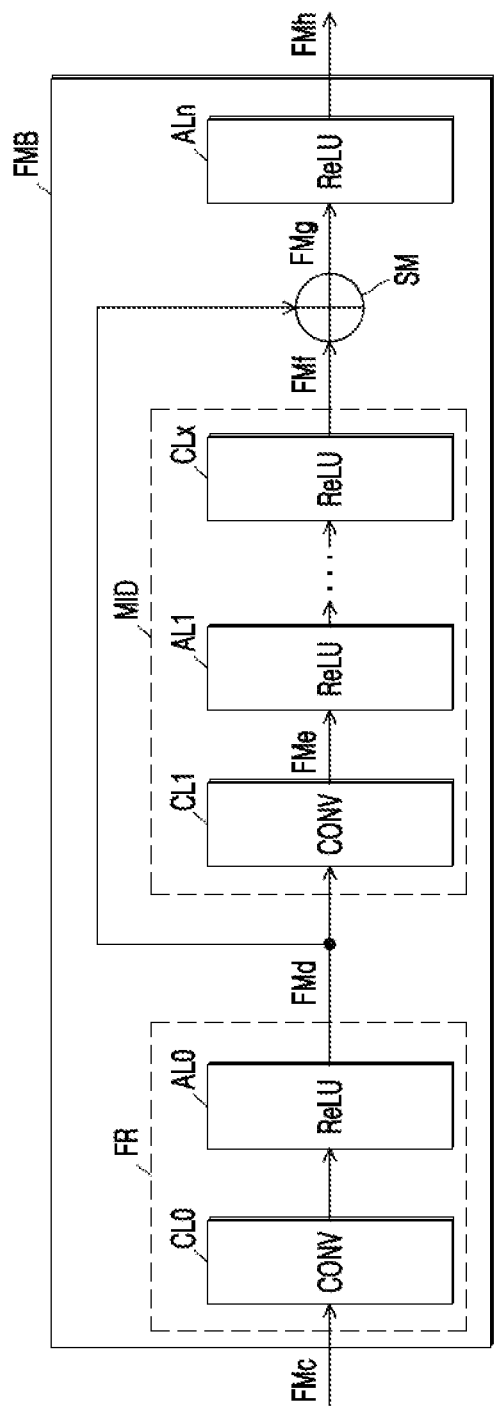
FIG. 8 is a block diagram of a feature map block according to an example embodiment.

FIG. 8 is a block diagram of a feature map block FMB according to an example embodiment.

Referring to FIG. 8, the feature map block FMB may include a plurality of layers and a summator SM. The plurality of layers may include a plurality of convolution layers CL0, CL1, and CLx and a plurality of activation layers AL0, AL1, and ALn.

According to an example embodiment, the feature map block FMB may receive a feature map FMc. Based on the feature map FMc, an input activation layer AL0 may output a feature map FMd to a middle layer group LG and the summator SM. Additionally, a middle layer group MID may output a feature map FMf. The summator SM may summate the feature maps FMd and FMf, which are received from the middle layer group MID and the input activation layer AL0 and output a feature map FMg.

A leading layer group FR may include a plurality of layers (e.g., CL0 and AL0). The leading layer group FR may be located at a front end of the feature map block FMB and receive a feature map FMc. The feature map FMc is received by the feature map block FMB. As an example, the leading layer group FR may include one convolution layer CL0 and one activation layer AL0. In another example, the leading layer group FR may include at least one convolution layer and at least one activation layer. The leading layer group FR may output the feature map FMd to the middle layer group MID and the summator SM.

The middle layer group MID may include a plurality of layers CL1, AL1, . . . , and CLx. In an example, the middle layer group MID may include a plurality of convolution layers and a plurality of activation layers. The plurality of convolution layers and the plurality of activation layers included in the middle layer group MID may be alternately located. In this case, a feature map FMe output by the convolution layer CL1 may be received by an activation layer AL1. The convolution layer CL1 may be disposed at a foremost end of the middle layer group MID. Alternatively, the convolution layer CLx may be located at a rearmost end of the middle layer group MID. In other words, the feature map FMd received by the convolution layer CL1 may be the same as the feature map FMd received by the middle layer group MID. The feature map FMf output by the convolution layer CLx may be the same as the feature map FMf output by the middle layer group MID.

An output activation layer ALn may receive the feature map FMg output by the summator SM. The output activation layer ALn may then activate characteristics of the feature map FMg and output a feature map FMh. The output activation layer ALn may be located at a rearmost end of the feature map block FMB.

Figure 9:
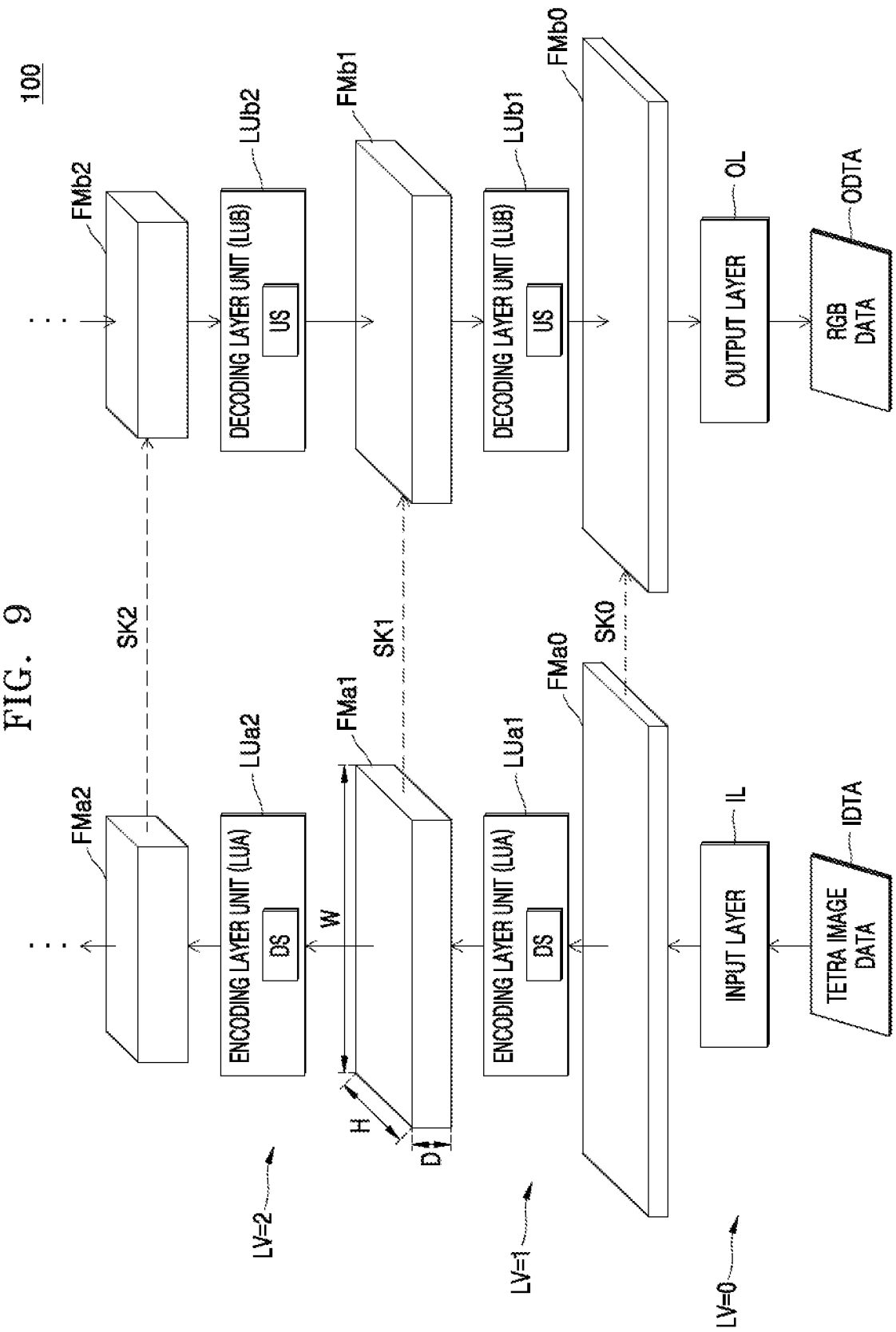
FIG. 9 is a diagram for explaining an ANN model according to an example embodiment.

FIG. 9 is a diagram for explaining an ANN model 100 according to an example embodiment.

Referring to FIG. 9, the ANN model 100 may include a feature map with different width W, height H, and depth D according to each level LV. For example, a feature map FMa0 output by an input layer IL may have a lowest depth D. The depth D may increase as an operation performed by the encoding layer unit LUa is repeated. Additionally, when the depth D increases exponentially, an operation amount to be processed per unit time may rapidly increase to thereby increase an operation time. Here, the operation amount may be expressed in units of, for example, trillion operations per second (TOPS).

According to an example embodiment, the ANN model 100 may perform an operation assigned to each layer and control a depth D of the feature map. For example, the encoding layer unit LUa and a decoding layer unit LUb may output a feature map with a depth D corresponding to each level. For example, the depth D of the output feature map may correspond to functions of the encoding layer unit LUa and the decoding layer unit LUb according to a level. In an example, the processing logic 200 may control the depth D of the feature map output by the ANN model 100. In another example, a function of depth D may be stored in each layer. In yet another example, a function of depth D may be stored in an external memory of the ANN model 100 and applied to each layer.

According to an example embodiment, the function of the depth D may be expressed as a function of a level LV of each layer. In an example, the function of the depth D may be linear with respect to the level LV. In this case, the function of the depth D may be a linear function with the level LV as a parameter and a function FD of a depth D may be expressed as shown in Equation: $FD=a*LV+b$. In another example, the function of the depth D may be an exponential function with the level LV as a base. For example, a function FD of a depth D may be expressed as shown in Equation: $FD=a*(LV^2)+b$. Alternatively, the function FD of the depth D may be expressed as shown in Equation: $FD=a*(LV^c)+b$. In yet another example, the function FD of the depth D may be a log function of the level LV, and a base of the log function may be arbitrarily selected. For example, the function of the depth D may be expressed as shown in Equation: $FD=b*\log(LV-2)$, wherein a, b, and c are constants and LV denotes a level of each layer. Additionally, the constant a may satisfy an inequality: $a \geq b/2$.

According to an example embodiment, the function FD of the depth D may be a function in which the level LV of each layer is not an exponent. For example, the function FD of the depth D may not be $b*(2^{LV})$. Alternatively, the function FD of the depth D may have a smaller depth D than a function with the level LV of each layer as an exponent. In this case, the smaller depth D is due to an increase in operation time caused by the ANN model 100.

FIG. 10 shows a table of depth values of a feature map according to an example embodiment. FIG. 10 exemplarily illustrates the functions FD described above with reference to FIG. 9.

According to an example embodiment, functions FD1 and FD2 may be included in an ANN model 100, while a function FD3 may not be included in the ANN model 100. The functions FD1 and FD2 of the ANN model 100 may increase depths of feature maps relatively monotonously even if a level LV increases. However, since the function FD3 has the level LV as an exponent, a depth of a feature map may sharply increase. Accordingly, the ANN model 100 may have a function, which does not have the level LV as an exponent, to shorten an operation time. For example, an encoding layer unit LUa and a decoding layer unit LUb may adjust depths of output feature maps as a result of a function not containing the level LV as the exponent.

Figure 11:
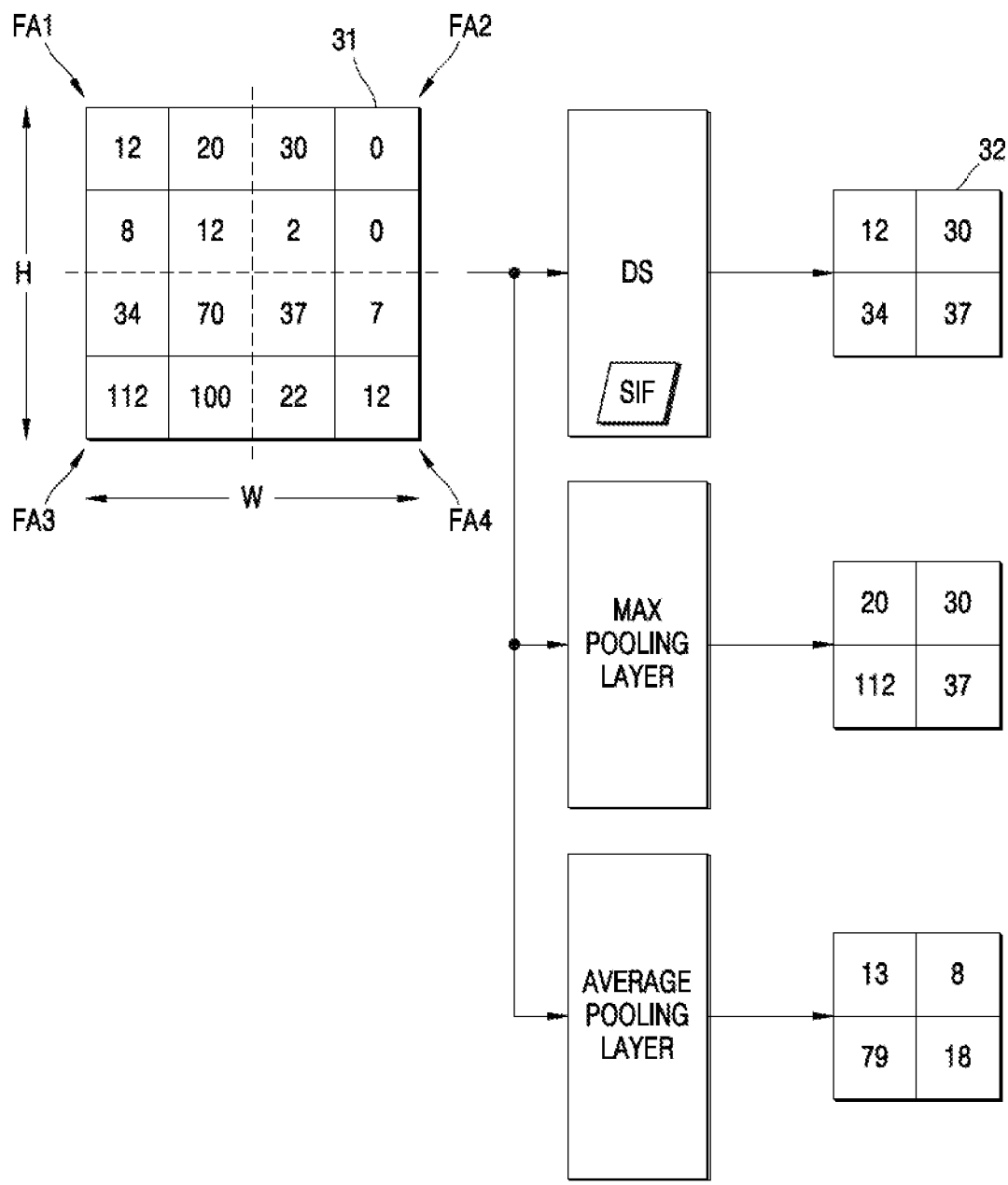
FIG. 11 is a diagram for explaining a down-sampling operation according to an example embodiment.

FIG. 11 is a diagram for explaining a down-sampling operation according to an example embodiment.

Referring to FIG. 11, a down-sampling layer DS may receive a feature map 31 and control a width W and a height H of the feature map 31. For example, the down-sampling layer DS may output an output feature map 32 of which a width W and a height H are controlled, based on sampling information SIF.

The down-sampling layer DS may perform a down-sampling operation based on the sampling information SIF. In other words, the down-sampling layer DS may select some feature values included in the feature map 31. The selected feature values may constitute the output feature map 32. For example, the output feature map 32 may have a smaller size (e.g., width W or height H) and include a smaller number of feature values than the feature map 31. Meanwhile, the sampling information SIF may be received by a processing logic 200. The sampling information SIF may be information written to the down-sampling layer DS.

The sampling information SIF may include sampling size information, sampling position information, and sampling window size information. The down-sampling layer DS may define a size of the output feature map 32 based on the sampling size information. For example, when a sampling size is equal to 2, at least one of the width W and the height H of the output feature map 32 may be equal to 2. For example, when the width W of the output feature map 32 is equal to 2, the output feature map 32 may have two columns. When the height H of the output feature map 32 is equal to 3, the output feature map 32 may have three rows.

The down-sampling layer DS may select feature values at the same position in respective feature map areas FA1 to FA4 based on the sampling position information. For example, when the sampling position information indicates a value in a first row and a first column, the down-sampling layer DS may calculate 12, 30, 34, and 37. In this case, the calculated values are values in the first row and the first column in the respective feature map areas FA1 to FA4, and generate the output feature map 32.

The down-sampling layer DS may define sizes of the respective feature map areas FA1 to FA4 based on the sampling window size information. For example, when a sampling window size is equal to 2, at least one of a width and a height of one feature map area may be equal to 2.

According to an example embodiment, the down-sampling layer DS may output the output feature map 32, which has a higher operation speed and higher image quality than a pooling layer. For example, a pooling layer may be a max-pooling layer or an average pooling layer. For example, an operation time taken for a down-sampling operation performed by the down-sampling layer DS may be shorter than a pooling operation time taken by the pooling layer.

Figure 12:
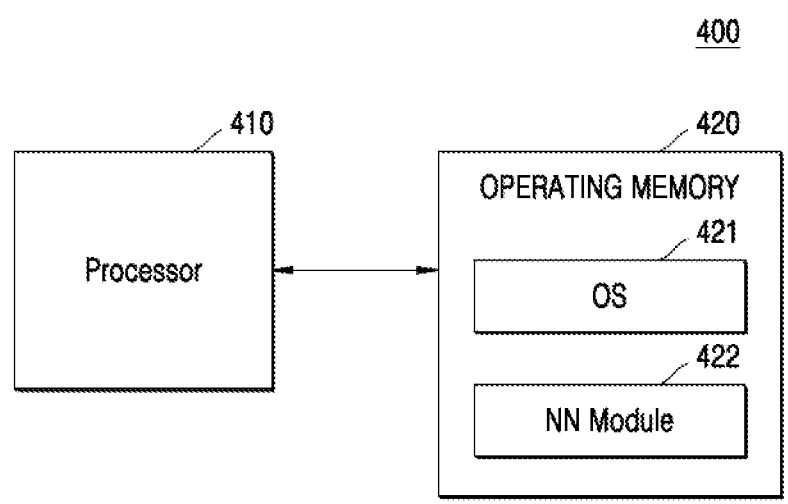
FIG. 12 is a block diagram of an application processor (AP) according to an example embodiment.

FIG. 12 is a block diagram of an AP 400 according to an example embodiment.

A system shown in FIG. 12 may be an AP 400, which may include a System-on-Chip (SoC) as a semiconductor chip.

The AP 400 may include a processor 410 and an operating memory 420. Although not shown in FIG. 12, the AP 400 may further include at least one intellectual property (IP) modules, which are connected to a system bus. The operating memory 420 may store software, such as various programs and instructions, which are related to operations of a system to which the AP 400 is applied. As an example, the operating memory 420 may include an operating system 421 and an ANN module 422. The processor 410 may execute the ANN module 422 loaded in the operating memory 420. The processor 410 may perform an operation based on the ANN model 100 including the encoding layer unit LUa and the decoding layer unit LUb according to the above-described embodiments.

Figure 13:
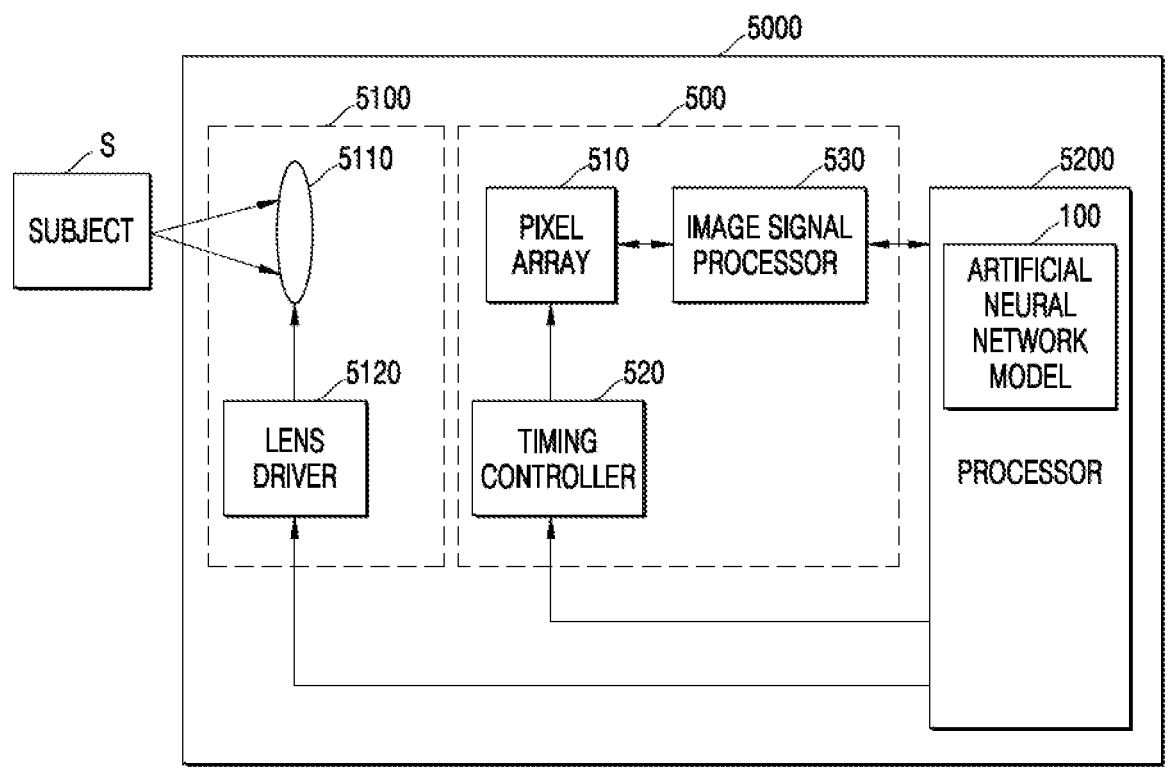
FIG. 13 is a block diagram of an imaging device according to an example embodiment.

FIG. 13 is a block diagram of an imaging device 5000 according to an example embodiment.

Referring to FIG. 13, the imaging device 5000 may include an image capturing unit 5100, an image sensor 500, and a processor 5200. For example, the imaging device 5000 may be an electronic device capable of performing an image processing operation. The imaging device 5000 may capture an image of a subject S and obtain an input image. The processor 5200 may provide control signals and/or information for operations of each component to a lens driver 5120 and a timing controller 520.

The image capturing unit 5100 may be a component configured to receive light and include a lens 5110 and the lens driver 5120, and the lens 5110 may include at least one lens. Additionally, the image capturing unit 5100 may further include an iris and an iris driver.

The lens driver 5120 may transmit and receive information about focus detection to and from the processor 5200 and adjust a position of the lens 5110 in response to a control signal provided by the processor 5200.

The image sensor 500 may convert incident light into image data. The image sensor 500 may include a pixel array 510, a timing controller 520, and an image signal processor 530. An optical signal transmitted through the lens 5110 may reach a light-receiving surface of the pixel array 510 and form an image of the subject S.

The pixel array 510 may be a complementary metal-oxide-semiconductor (CMOS) image sensor (CIS) configured to convert an optical signal into an electric signal. An exposure time and sensitivity of the pixel array 510 may be adjusted by the timing controller 520. As an example, the pixel array 510 may include a color filter array used to obtain the tetra image described above with reference to FIG. 3.

The processor 5200 may receive image data from an image signal processor 530 and perform various image post-processing operations on image data. For example, the processor 5200 may convert an input image (e.g., a tetra image) into an output image (e.g., an RGB image) based on the ANN model 100 according to the above-described embodiments. Meanwhile, the inventive concept is not limited thereto, and the image signal processor 530 may also perform an operation based on the ANN model 100. Alternatively, various operation processing devices located inside or outside the imaging device 5000 may convert a format of an input image based on the ANN model 100 and generate an output image.

According to the present embodiment, the imaging device 5000 may be included in various electronic devices. For example, the imaging device 5000 may be mounted on electronic devices, such as a camera, a smartphone, a wearable device, an IoT device, a tablet personal computer (PC), a laptop PC, a personal digital assistant (PDA), a portable multimedia player (PMP), a navigation device, and a display device. Also, the imaging device 5000 may be mounted on an electronic device included as a component in a vehicle, furniture, manufacturing equipment, doors, and various measuring devices.

While the inventive concept has been particularly shown and described with reference to embodiments thereof, it will be understood that various changes in form and details may be made therein without departing from the spirit and scope of the following claims.

What is claimed is:

1. An electronic device comprising
a processing logic configured to receive input image data and generate output image data having a different format from the input image data using an artificial neural network model,
wherein the artificial neural network model comprises:
a plurality of encoding layer units comprising a plurality of layers, wherein each layer of the plurality of layers comprises an encoder level, and wherein the encoder level comprises an ordinal number of layers from an input layer; and
a plurality of decoding layer units comprising a plurality of other layers, wherein each other layer of the plurality of other layers comprises a decoder level, wherein the decoder level comprises an ordinal number of layers from an output layer, and wherein each other layer is configured to form a skip connection with a corresponding layer of the plurality of layers having a same encoder level as the decoder level of the other layer,
wherein a first encoding layer unit of a first level receives a first input feature map and outputs a first output feature map, which is based on the first input feature map, to a subsequent encoding layer unit and a decoding layer unit at the first level.

2. The electronic device of claim 1, wherein
the processing logic receives skip level information and activates or inactivates the skip connection based on a skip level indicated by the skip level information.

3. The electronic device of claim 1, wherein
a layer of the encoding layer unit and a layer of the decoding layer unit, which are connected by the skip connection, perform symmetrical operations to each other.

4. The electronic device of claim 1, wherein
the first encoding layer unit adjusts a depth of the first output feature map based on the first level.

5. The electronic device of claim 4, wherein
the first encoding layer unit adjusts a depth of an output feature map based on a function having the first level as a parameter, and the function is a linear function having the first level as the parameter.

6. The electronic device of claim 1, wherein
convolution layers of the encoding layer unit and the decoding layer unit, which are at a same level, are connected by the skip connection, feature map blocks of the encoding layer unit and the decoding layer unit, which are at the same level, are connected by the skip connection, or a down-sampling layer and an up-sampling layer of the encoding layer unit and the decoding layer unit, which are at the same level, are connected by the skip connection.

7. The electronic device of claim 1, wherein the encoding layer unit and the decoding layer unit at each level comprise feature map blocks,
wherein each of the feature map blocks comprises a leading layer group configured to output a first feature map, a middle layer group configured to receive the first feature map and output a second feature map, a summator configured to summate the first feature map and the second feature map and output a third feature map, and an output activation layer configured to output a fourth feature map based on the third feature map.

8. The electronic device of claim 1, wherein the encoding layer unit comprises a down-sampling unit configured to receive a fifth feature map, select some of feature values included in the fifth feature map, and output the first output feature map having a smaller size than the fifth feature map.

9. The electronic device of claim 1, wherein the input image data comprises a tetra image, and the output image data comprises a red-green-blue (RGB) image.

10. An electronic device comprising
a processing logic configured to perform an operation using an artificial neural network model,
wherein the artificial neural network model comprises:
a plurality of encoding layer units comprising a plurality of layers, wherein each layer of the plurality of layers comprises an encoder level, and wherein the encoder level comprises an ordinal number of layers from an input layer; and
a plurality of decoding layer units comprising a plurality of other layers, wherein each other layer of the plurality of other layers comprises a decoder level, wherein the decoder level comprises an ordinal number of layers from an output layer, and wherein each other layer is configured to form a skip connection with a corresponding layer of the plurality of layers having a same encoder level as the decoder level of the other layer, respectively,
wherein a first encoding layer unit located at a first level of the plurality of levels receives a first input feature map, outputs a first output feature map to an encoding layer unit located at a next level of the first level and a decoding layer unit of the first level, and adjusts a depth of the first output feature map based on the first level.

11. The electronic device of claim 10, wherein the first encoding layer unit adjusts a depth of an output feature map based on a function having the first level as a parameter, and the function adjusts the depth of the output feature map to a smaller value than a function having the first level as an exponent.

12. The electronic device of claim 10, wherein a layer of the encoding layer unit and a layer of the decoding layer unit, which are at a same level, are selectively connected to each other.

13. The electronic device of claim 12, wherein the processing logic receives skip level information and activates or inactivates connection of the plurality of encoding layer units and the plurality of decoding layer units, which are at the same levels, based on a skip level indicated by the skip level information.

14. The electronic device of claim 12, wherein the layer of the encoding layer unit and the layer of the decoding layer unit, which are at the same level, perform symmetrical operations to each other.

15. The electronic device of claim 12, wherein convolution layers of the encoding layer unit and the decoding layer unit, which are at the same level, are selectively connected to each other, feature map blocks of the encoding layer unit and the decoding layer unit, which are at the same level, are selectively connected to each other, or a down-sampling layer and an up-sampling layer of the encoding layer unit and the decoding layer unit, which are at the same level, are connected to each other.

16. The electronic device of claim 10, wherein the encoding layer unit and the decoding layer unit, which are at each level, comprise feature map blocks,
wherein each of the feature map blocks comprises a leading layer group configured to output a first feature map, a middle layer group configured to receive the first feature map and output a second feature map, a summator configured to summate the first feature map and the second feature map and output a third feature map, and an output activation layer configured to output a fourth feature map based on the third feature map.

17. The electronic device of claim 16, wherein wherein the leading layer group comprises one convolution layer and one activation layer, and
the middle layer group is configured to sequentially connect a plurality of convolution layers and a plurality of activation layers.

18. The electronic device of claim 10, wherein the encoding layer unit comprises a down-sampling unit configured to receive a fifth feature map, select some of feature values included in the fifth feature map, and output the first output feature map having a smaller size than the fifth feature map.

19. The electronic device of claim 18, wherein the processing logic receives sampling position information, and
the down-sampling unit selects feature values located at a position based on the sampling position information, from among feature values included in the fifth feature map.

20. An electronic device configured to perform an image processing operation, the electronic device comprising
a processing logic configured to receive tetra image data from a color filter array in which four identical color filters are arranged in two rows and two columns and form one pixel unit, the processing logic being configured to generate output image data having a different format from the tetra image data using an artificial neural network model,
wherein the artificial neural network model comprises:
a plurality of encoding layer units comprising a plurality of layers, wherein each layer of the plurality of layers comprises an encoder level, and wherein the encoder level comprises an ordinal number of layers from an input layer, respectively; and
a plurality of decoding layer units comprising a plurality of other layers, wherein each other layer of the plurality of other layers comprises a decoder level, wherein the decoder level comprises an ordinal number of layers from an output layer, and wherein each other layer is configured to form a skip connection with a corresponding layer of the plurality of layers having a same encoder level as the decoder level of the other layer, wherein a first encoding layer unit receives a first input feature map and outputs a first output feature map, which is based on the first input feature map, to a subsequent encoding layer unit and a decoding layer unit at a first level.

\* \* \* \* \*